United States Patent
Pabst et al.

(10) Patent No.: US 6,881,356 B2
(45) Date of Patent: Apr. 19, 2005

(54) METHOD FOR PRODUCING TANNING AGENTS CONTAINING SULPHONE

(75) Inventors: Gunther Pabst, Mannheim (DE); Gerhard Wolf, Ketsch (DE); Jürgen Kast, Boehl-Iggelheim (DE); Jürgen Werner, Bad Duerkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/486,208

(22) PCT Filed: Aug. 16, 2002

(86) PCT No.: PCT/EP02/09186

§ 371 (c)(1),
(2), (4) Date: Feb. 17, 2004

(87) PCT Pub. No.: WO03/016578

PCT Pub. Date: Feb. 27, 2003

(65) Prior Publication Data

US 2004/0250353 A1 Dec. 16, 2004

(30) Foreign Application Priority Data

Aug. 17, 2001 (DE) .......................... 101 40 551

(51) Int. Cl.⁷ ............................. C14G 1/00; C08G 14/02
(52) U.S. Cl. ................. 252/94.15; 252/94.18; 252/94.19 R; 252/94.33; 252/404; 528/129; 528/143
(58) Field of Search ............... 8/94.15, 94.18, 8/94.19 R, 94.33, 404; 528/129, 143

(56) References Cited

U.S. PATENT DOCUMENTS 4,211,856 A * 7/1980 Valgin et al. ............... 528/141
4,592,940 A    6/1986 Blyth et al.

FOREIGN PATENT DOCUMENTS

| DE | 11 13 457 | 9/1961 |
| DE | 40 14 977 | 11/1991 |
| EP | 0 245 205 | 11/1987 |
| EP | 0 428 481 | 5/1991 |
| EP | 0 459 168 | 12/1991 |
| GB | 722 370   | 1/1955 |

* cited by examiner

Primary Examiner—Brian P Mruk
Assistant Examiner—D G Hamlin
(74) Attorney, Agent, or Firm—Oblon, Spivak, McClelland, Maier & Neustadt, P.C.

(57) ABSTRACT

A process for preparing a solution of sulfone-containing tanning materials comprises
a) preparing a component A by
  a1) reacting phenol with concentrated sulfuric acid, with oleum of an $SO_3$ content of from 20 to 65% by weight or with a mixture of sulfuric acid and oleum of an $SO_3$ content of from 20 to 65% by weight, the molar ratio of total sulfuric acid, reckoned as $SO_3$, to phenol being in the range from 0.7:1 to 1.5:1, at from 100 to 180° C. to form a mixture containing phenolsulfonic acid, dihydroxydiphenyl sulfone and sulfuric acid, or mixing the individual components to prepare a corresponding mixture,
  a2) then condensing said mixture with from 0.25 to 4 mol of urea and with from 0.5 to 4 mol of an aliphatic aldehyde of 1 to 6 carbon atoms per mole of phenol units present at from 40 to 90° C.,
  a3) optionally adding a base to set a pH of from 4 to 5,
b) preparing a component B by
  b1) reacting dihydroxydiphenyl sulfone with from 0.5 to 5 mol of an aliphatic aldehyde of from 1 to 6 carbon atoms and with from 0.4 to 2 mol of sodium sulfite per mole of dihydroxydiphenyl sulfone at from 90 to 180° C.,
  b2) optionally adding an acid to set a pH of from 3.5 to 5.5,
c) mixing from 10 to 90% by weight of component A with from 90 to 10% by weight of component B, the sum total of A and B being 100% by weight, and, unless already effected in steps a3) and b2), setting the pH of the mixture to a value in the range from 3.5 to 5.5.

10 Claims, No Drawings

METHOD FOR PRODUCING TANNING AGENTS CONTAINING SULPHONE

This invention relates to a process for preparing a solution of sulfone-containing tanning materials, the thereby obtainable solution itself, the sulfone-containing tanning material isolated from this solution, the use of the solution and of the sulfone-containing tanning material for tanning leather, a process for tanning leather and also the tanned leather itself.

Condensation products based on dihydroxydiphenyl sulfone are known for example from DE-B 11 13 457, EP-A 0 245 205, EP-B 0 428 481, U.S. Pat. No. 4,592,940 and EP-B 0 459 168 and can be prepared by the processes described therein.

In DE-B 11 13 457, sulfonated phenols which are free of fused ring systems are reacted with from 1 to 1.5 mol of urea and with from 1.7 to 2.2 mol of formaldehyde per mole of the sulfonated phenol or phenol mixture and the resultant condensate is aftertreated with phenol and formaldehyde.

EP-A 0 245 205 relates to an aqueous composition containing a reaction product of phenol and a sulfonating agent with the molar ratio of phenol:$SO_3$ being 1:1.1–2.2, a water-soluble alkylamine, alkanolamine, alkylenediamine, polyalkylenepolyamine or heterocyclic amine, a water-soluble chromium, aluminum, iron or zirconium tanning salt and optionally an alkali metal salt of ethylenediaminetetraacetic acid or of a pyrophosphate.

EP-A 0 428 481 discloses an agent for treating leather and furs, containing as component (A) formaldehyde condensation products of 4,4'-dihydroxydiphenyl sulfones with hydroxyarylsulfonic acids or formaldehyde condensation products of oxydiarylsulfonic acids with 4,4'-dihydroxydiphenyl sulfone and as component (B) an addition polymer or copolymer of unsaturated $C_3$–$C_5$-mono- or dicarboxylic acids or of hydroxy compounds thereof.

U.S. Pat. No. 4,592,940 discloses a process for imparting stain resistance to nylon carpets by treating the latter with an aqueous solution of the condensation product of formaldehyde with a mixture of diphenyl sulfone and phenolsulfonic acid.

EP-A 0459 168 discloses condensation products of phenolmonosulfonic acids, dihydroxydiphenyl sulfones, urea and formaldehyde which are obtainable by A) heating phenol with concentrated sulfuric acid, with oleum or with a mixture of sulfuric acid and oleum to 100–180° C. with the molar ratio of phenol to total sulfuric acid, reckoned as $SO_3$, being in the range from 1 to 1.2:1,
B) then precondensing at from 40 to 90° C. with from 1 to 2 mol of formaldehyde and with from 0.5 to 1.5 mol of urea in an aqueous medium per mole of phenol units present,
C) partially neutralizing the reaction mixture,
D) admixing the partially neutralized reaction mixture with from 0 to 0.5 mol of phenol per mole of phenol units present and with from 0.1 to 0.8 mol of formaldehyde per mole of phenol units then present,
E) supplementarily condensing at from 40 to 90° C.,
F) shifting the pH of the reaction mixture into the neutral range, and
G) then acidifying with a weak acid.

The condensation products are used for tanning animal integuments.

As a person skilled in the art will know, tanning materials prepared using dihydroxydiphenyl sulfone (DHDPS) are notable for a particularly good tanning effect and hence for particularly good fastness properties. However, the use of tanning materials having a high DHDPS content may also give rise to adverse outworkings of this tanning effect on leather. For instance, an excessive adstringency may cause the grain of the leather to be excessively loaded and hence to become drawn. The loading on the grain may cause the grain to break, distinctly reducing the quality of the leather. The surficial deposition of highly adstringent tanning materials, furthermore, leads to reduced penetration not only of the tanning materials used, but also of all other auxiliaries. It is further observed that the high adstringency of sulfone-containing tanning materials leads to a pronounced bleaching effect, as a result of which it is difficult to produce dark, intensively colored leathers in particular.

Considering, in contrast, tanning materials having a low DHDPS content, an unsatisfactory aspect observed is that their tanning effect and hence the stabilization of the collagen fiber is frequently too small. But a good tanning effect is important in relation to wet white leathers, since they are decisively dependent on the tanning effect of the syntans used, in the absence of the tanning effect of chromium. True, the tanning effect of the syntans can be controlled to a certain extent via their molecular weight, but the relatively high molecular weight tanning materials which possess higher tanning activity have the disadvantage of reduced penetration into the leather cross section and hence of an undesirable surficial deposition of the tanning materials. Furthermore, leathers treated with tanning materials having a low DHDPS content generally have less satisfactory fastness properties.

It is an object of the present invention to provide novel tanning materials having advantageous properties. It is an especial object of the present invention to provide tanning materials having a good tanning effect and good penetration that will provide leathers having good fastness properties, softness and fullness.

We have found that these objects are achieved by a process for preparing a solution of sulfone-containing tanning materials, which comprises a) preparing a component A by
 a1) reacting phenol with concentrated sulfuric acid, with oleum of an $SO_3$ content of from 20 to 65% by weight or with a mixture of sulfuric acid and oleum of an $SO_3$ content of from 20 to 65% by weight, the molar ratio of total sulfuric acid, reckoned as $SO_3$, to phenol being in the range from 0.7:1 to 1.5:1, at from 100 to 180° C. to form a mixture containing phenolsulfonic acid, dihydroxydiphenyl sulfone and sulfuric acid, or mixing the individual components to prepare a corresponding mixture,
 a2) then condensing said mixture with from 0.25 to 4 mol of urea and with from 0.5 to 4 mol of an aliphatic aldehyde of 1 to 6 carbon atoms per mole of phenol units present at from 40 to 90° C.,
 a3) optionally adding a base to set a pH of from 4 to 5,
b) preparing a component B by
 b1) reacting dihydroxydiphenyl sulfone with from 0.5 to 5 mol of an aliphatic aldehyde of from 1 to 6 carbon atoms and with from 0.4 to 2 mol of sodium sulfite per mole of dihydroxydiphenyl sulfone at from 90 to 180° C.,
 b2) optionally adding an acid to set a pH of from 3.5 to 5.5,
c) mixing from 10 to 90% by weight of component A with from 90 to 10% by weight of component B, the sum total of A and B being 100% by weight, and, unless already effected in steps a3) and b2), setting the pH of the mixture to a value in the range from 3.5 to 5.5.

We have found that, surprisingly, blends of tanning materials having a low DHDPS content (component A) with tanning materials having a high DHDPS content (component B) retain the tanning effect of the tanning materials having a high DHDPS content while at the same time possessing good penetration for the blend. This avoids surficial deposition of the tanning material on the leather. Not only appreciable advantages result with regard to dyeing. The surface is dyed more intensively and darker while at the same time good penetration of the leather cross section is achieved for the colorant. This makes it possible to achieve savings in terms of the dye used, which improves the economics. Secondly, drawn or burst grain is prevented and the uniformity of break after milling is improved.

Although the process of the invention utilizes conventional starting materials to prepare sulfone-containing tanning materials, the novel reaction sequence and the novel amount ratio of the starting materials leads to products having improved performance characteristics. The invention accordingly also provides the sulfone-containing tanning material solutions obtained by the process of the invention and the sulfone-containing tanning materials themselves which are isolable therefrom.

The aliphatic aldehydes used to prepare components A and B generally have 1 to 6, preferably 1 to 4 and more preferably 1 or 2 carbon atoms. The aliphatic aldehyde used is in particular formaldehyde, customarily in the form of an aqueous solution, for example in the form of a 30% by weight aqueous solution.

Component A is prepared by reacting phenol with concentrated sulfuric acid, preferably 96% by weight sulfuric acid, and/or oleum of an $SO_3$ content of from 20 to 65% by weight at from 100 to 180° C. for generally from 1 to 10 and preferably from 3 to 6 hours using a molar ratio for total sulfuric acid, reckoned as $SO_3$, to phenol in the range from 0.7:1 to 1.5:1, preferably in the range from 0.8:1 to 1.2:1, more preferably in the range from 0.9:1 to 1.1:1 and most preferably equal to 1:1. This produces phenolmonosulfonic acid and dihydroxydiphenyl sulfones (4,4'-, 2,4'- and 2,2'-isomers). It additionally by-produces small amounts of product such as higher condensation products of $SO_3$ and phenol (trimers, tetramers). It will be appreciated that a correspondingly composed phenolmonosulfonic acid/dihydroxydiphenyl sulfone/sulfuric acid mixture may also be prepared by blending the components in question instead of by in situ sulfonation.

The exact composition of the reaction mixture obtained in step a1) can be determined by high pressure liquid chromatography for example. The amount of dihydroxydiphenyl sulfones formed in situ is especially influenced by the reaction temperature and also by the $SO_3$ content of the reaction mixture. The reaction is preferably carried out at from 150 to 180° C. using oleum of an $SO_3$ content of from 20 to 32% by weight. The mixture of phenol and concentrated sulfuric acid and/or oleum that is to be heated to 100–180° C. is conveniently prepared by adding the acids dropwise and continuously to heated phenol at about 60° C., causing the temperature to rise to about 90–100° C. The temperature can be regulated by cooling, if appropriate.

An adjoining step a2) comprises condensing the mixture of phenolsulfonic acid, dihydroxydiphenyl sulfone and sulfuric acid at from 40 to 90° C., for example at about 80° C., with from 0.25 to 4 mol, preferably with from 0.4 to 0.8 mol of urea and with 0.5 to 4 mol and preferably from 0.75 to 1.5 mol of an aliphatic aldehyde, especially formaldehyde, per mole of phenol units present. The urea is customarily added as an aqueous solution, for example as a 68% by weight aqueous solution, and the aldehyde is then metered in over a period of generally from 0.25 to 8 and preferably from 0.25 to 2 hours.

A step a3) may then be carried out to set a pH of from 3.5 to 5.5, preferably from 4 to 5, more preferably from 4.3 to 4.8 and most preferably from 4.4 to 4.6. The pH may be set by adding a commercially available base, such as alkali metal hydroxide or ammonia. It is also possible first to add a base for neutralization and then a weak acid, for example acetic acid, formic acid, oxalic acid, succinic acid, glutaric acid or citric acid, to set a pH of from 3.5 to 5.5.

Component A thus prepared generally contains from 2 to 30% and preferably from 5 to 15% by weight of dihydroxydiphenyl sulfone in free or bound form, based on the dry weight.

Component B is prepared by reacting in step b1) dihydroxydiphenyl sulfone with from 0.5 to 5 mol, preferably from 1 to 1.4 mol, more preferably from 1.1 to 1.3 mol and most preferably about 1.2 mol of an aliphatic aldehyde, especially formaldehyde, per mole of dihydroxydiphenyl sulfone and with from 0.4 to 2 mol, preferably from 0.5 to 0.8 mol and especially from 0.6 to 0.7 mol of sodium sulfite per mole of dihydroxydiphenyl sulfone at from 90 to 180° C. The reaction is customarily carried out in aqueous solution under superatmospheric pressure. For example, dihydroxydiphenyl sulfone and formaldehyde in the form of their aqueous solutions and also solid sodium sulfite are introduced into a pressure reactor and the mixture is heated to 115° C. After the reaction has started, the temperature climbs to about 150–160° C. and the pressure to about 4–5 bar. The reaction generally takes from 2 to 10 hours. Dihydroxydiphenyl sulfone for the purposes of this invention is the 4,4'-isomer. This isomer can also be used as technical grade dihydroxydiphenyl sulfone, i.e., in a mixture with about 10 to 15% by weight of a 2,4'-isomer and from 0 to 5% by weight of p-phenolsulfonic acid.

A step b2) may then be carried out to adjust the pH of component B to 3.5–5.5, preferably 4–5, more preferably 4.3–4.8 and most preferably 4.4–4.6. The pH may be adjusted by addition of an acid such as sulfuric acid, formic acid or acetic acid.

The free or bound dihydroxydiphenyl sulfone content of component B is generally in the range from 30 to 100% by weight, preferably in the range from 40 to 70% by weight and more preferably in the range from 45 to 55% by weight, based on the dry weight.

A step c) comprises mixing from 10 to 90% by weight, preferably from 20 to 80% by weight and more preferably from 30 to 70% by weight of component A with from 90 to 10% by weight, preferably from 80 to 20% by weight and more preferably from 70 to 30% by weight of component B, the sum total of A and B being 100% by weight. If the pH has not already been adjusted in components A and B, this is now accomplished in the mixture of A and B using the abovementioned acids and bases respectively.

The resultant solution of the sulfone-containing tanning materials can be used directly as a tanning agent. However, it is also possible to isolate the sulfone-containing tanning material from this solution. This may be effected in a conventional manner, for example by precipitating the tanning material by adding a water-miscible liquid in which the tanning material is not soluble or preferably by evaporating the liquid reaction medium, for example by spray drying. The tanning material is customarily isolated for the purposes of shipment. The solid sulfone-containing tanning material is redissolved in water before use.

The present invention also provides for the use of the solutions according to the invention and of the sulfone-containing tanning materials isolable therefrom for tanning leather.

The invention further provides a process for tanning leather, which comprises treating leather with an aqueous solution of the sulfone-containing tanning material according to the invention. Commercially available dispersants, especially anionic dispersants, and/or commercially available synthetic, polymeric and/or vegetable tanning materials can be used as well. This makes it possible to create special effects on the treated leather.

Having regard to the novel combination of the advantageous properties of the leathers treated using the tanning materials of the invention, the treated leathers are themselves part of the subject matter of the present invention.

The examples which follow illustrate the invention.

EXAMPLES

Example 1

Preparation of Component A 40 kmol of heated phenol at 60° C. are admixed with 40 kmol of oleum having an $SO_3$ content of 24% by weight in the course of an hour. The resultant mixture is heated to 160° C. and stirred at 160° C. for 4 hours. After cooling to 80° C., 25 kmol of urea in the form of a 68% by weight aqueous solution are stirred in, followed by 40 kmol of formaldehyde as a 30% by weight aqueous solution added over 1½ hours. The resultant mixture is then admixed with about 34 kmol of NaOH in the form of a 50% by weight aqueous solution to set a pH of 4.5.

The dihydroxydiphenyl sulfone content is 10% by weight, based on the dry weight.

Example 2

Preparation of Component B

A pressure reactor is charged with 10 kmol of technical grade dihydroxydiphenyl sulfone (containing 80% by weight of the 4,4'-isomer and about 10–15% by weight of the 2,4'-isomer and also small amounts of p-phenolsulfonic acid) as a 60% by weight aqueous solution. 12 kmol of formaldehyde in the form of a 30% by weight aqueous solution are added as are 6.5 kmol of solid sodium sulfide. The pressure reactor is sealed and the mixture is heated to 115° C. The temperature then rises to about 150–160° C. and the pressure to 4–5 bar. After stirring at 160° C. for 3 hours, the solution obtained is cooled and the pH is adjusted to 4.5 by addition of formic acid.

The dihydroxydiphenyl sulfone content is 50% by weight, based on the dry weight.

Example 3

1:1 Mixture of Components A and B (Product C)

50 parts by weight of component A in which the pH has not as yet been adjusted by addition of aqueous sodium hydroxide solution are mixed with 50 parts by weight of component B in which the pH has not as yet been adjusted by addition of formic acid for 4 hours until homogeneous. Formic acid is then added to set a pH of 4.5 and the mixture is diluted with 5 parts by weight of water.

The dihydroxydiphenyl sulfone content is 30% by weight, based on the dry weight.

Example 4

Preparation of a 3:7 Mixture of Components A and B (Product D)

Example 3 is repeated except that 30 parts by weight of component A are mixed with 70 parts by weight of component B.

The dihydroxydiphenyl sulfone content is 42% by weight, based on the dry weight.

Example 5

Use of Components A and B (Comparative) and of Products C and D (Inventive) as Self-Tannins The subsequent % ages are based on the pelt weight.

A conventionally pickled cattlehide pelt (split thickness 3 mm) in 75% of water in a tanning drum is admixed with 25% of tanning material and agitated for 10 hours in a conventional drum at a pH in the range from 3.0 to 4.0. The float is removed and the leather is drummed for 60 minutes with 50% of water and 5% of a commercially available fatliquor. The pH is then adjusted to 3.2–3.5 with dilute formic acid. The leather is set out, dried, conditioned and staked. The leather thus treated is tested for its DIN 53336 shrinkage temperature and for lightfastness, fullness and softness. Lightfastness, fullness and softness are rated on a scale from 1=very good to 5=very poor.

The results are summarized below in Table 1.

TABLE 1

| Product | Shrinkage temperature | Light-fastness | Fullness | Softness |
|---|---|---|---|---|
| Component A | 66° C. | 2.0 | 4.0 | 3.0 |
| Component B | 75° C. | 3.0 | 2.0 | 3.0 |
| Product C | 74° C. | 1.5 | 2.0 | 2.0 |
| Product D | 75° C. | 2.0 | 2.0 | 2.5 |

The results show that products C and D provide not only a very good tanning effect (see shrinkage temperature) but also good fullness and good softness. As a person skilled in the art will know, softness depends on the penetration of the tanning material. The leather treated with component B showed a distinct crack in the grain on mechanical exposure.

Example 6

Application to Wet Blue for Shoe Upper Leather

The following % ages are based on the shaved weight.

Cattlehide wet blue 1.5 mm in shaved thickness is conventionally rinsed, washed and then neutralized to pH 4.4–4.6 in 100% of water using a sodium bicarbonate/sodium formate mixture. It is then retanned with 8% of tanning material for 90 minutes in 100% of new float at 40° C., rinsed and dyed in 100% of water at 50° C. for 20 minutes in a conventional manner. It is then fatliquored with 5% of commercially available fatliquor for 40 minutes and adjusted to pH 3.6 using formic acid. Depth of shade, color penetration, softness, fullness and grain firmness of the leathers thus treated are rated on a scale from 1=very good to 5=very poor.

The results are summarized below in Table 2.

TABLE 2

| Product | Depth of shade | Penetration | Softness | Fullness | Grain firmness |
|---|---|---|---|---|---|
| Component A | 2.0 | 3.5 | 3.5 | 4.0 | 2.0 |
| Component B | 4.5 | 3.0 | 2.5 | 2.5 | 3.0 |
| Product C | 2.5 | 2.0 | 2.0 | 2.5 | 1.5 |
| Product D | 3.0 | 2.5 | 2.5 | 2.0 | 2.0 |

As the results in the table show, mixtures C and D are superior to the starting components A and B with regard to the totality of the properties assessed. They especially lead to good penetration in combination with a good surface dyeing (depth of shade). This is surprising, since these properties usually run counter to each other. Mixtures C and D further provide better fullness and softness than the starting components A and B.

We claim:

1. A process for preparing a solution of sulfone-containing tanning materials, which comprises
   a) preparing a component A by
      a1) reacting phenol with concentrated sulfuric acid, with oleum of an $SO_3$ content of from 20 to 65% by weight or with a mixture of sulfuric acid and oleum of an $SO_3$ content of from 20 to 65% by weight, the molar ratio of total sulfuric acid, reckoned as $SO_3$, to phenol being in the range from 0.7:1 to 1.5:1, at from 100 to 180° C. to form a mixture containing phenolsulfonic acid, dihydroxydiphenyl sulfone and sulfuric acid, or mixing the individual components to prepare a corresponding mixture,
      a2) then condensing said mixture with from 0.25 to 4 mol of urea and with from 0.5 to 4 mol of an aliphatic aldehyde of 1 to 6 carbon atoms per mole of phenol units present at from 40 to 90° C.,
      a3) optionally adding a base to set a pH of from 4 to 5,
   b) preparing a component B by
      b1) reacting dihydroxydiphenyl sulfone with from 0.5 to 5 mol of an aliphatic aldehyde of from 1 to 6 carbon atoms and with from 0.4 to 2 mol of sodium sulfite per mole of dihydroxydiphenyl sulfone at from 90 to 180° C.,
      b2) optionally adding an acid to set a pH of from 3.5 to 5.5,
   c) mixing from 10 to 90% by weight of component A with from 90 to 10% by weight of component B, the sum total of A and B being 100% by weight, and, unless already effected in steps a3) and b2), setting the pH of the mixture to a value in the range from 3.5 to 5.5.

2. A process as claimed in claim 1, wherein step a1) comprises reacting phenol with oleum of an $SO_3$ content of from 20 to 32% by weight at from 150 to 180° C.

3. A process as claimed in claim 1, wherein step a1) is effected using a molar ratio of from 0.8:1 to 1.2:1 for total sulfuric acid to phenol.

4. A process as claimed in claim 1, wherein step a2) is effected using from 0.4 to 0.8 mol of urea and from 0.75 to 0.5 mol of formaldehyde per mole of phenol units present.

5. A process as claimed in claim 1, wherein step b1) is effected using from 1 to 1.4 mol of formaldehyde and from 0.5 to 0.8 mol of sodium sulfite per mole of dihydroxydiphenyl sulfone.

6. A process as claimed in claim 1, wherein a pH of from 4.4 to 4.6 is set in steps a3) and b2) or c).

7. A solution of sulfone-containing tanning materials, preparable by the process of claim 1.

8. The tanning material isolable from the solution of claim 7.

9. A process for tanning leather, which comprises treating leather with an aqueous solution of the sulfone-containing tanning material of claim 8.

10. Tanned leather obtainable by the process of claim 9.

* * * * *